(12) United States Patent
Campbell

(10) Patent No.: US 7,340,491 B2
(45) Date of Patent: Mar. 4, 2008

(54) METHODS AND APPARATUS FOR DATA PRESERVATION AND SOFTWARE DISTRIBUTION WITHIN AN ENTERPRISE SYSTEM

(75) Inventor: Scott Campbell, Chicago, IL (US)

(73) Assignee: SecureInfo Corporation, McLean, VA (US)

( * ) Notice: Subject to any disclaimer, the term of this patent is extended or adjusted under 35 U.S.C. 154(b) by 473 days.

(21) Appl. No.: 10/831,322

(22) Filed: Apr. 26, 2004

(65) Prior Publication Data

US 2005/0055357 A1    Mar. 10, 2005

Related U.S. Application Data

(60) Provisional application No. 60/465,121, filed on Apr. 24, 2003, provisional application No. 60/465,118, filed on Apr. 24, 2003, provisional application No. 60/465,122, filed on Apr. 24, 2003.

(51) Int. Cl.
  *G06F 7/00* (2006.01)
  *G06F 12/00* (2006.01)
  *G06F 17/30* (2006.01)
(52) U.S. Cl. ......................................... 707/204; 707/6
(58) Field of Classification Search .................... 707/8, 707/9, 100, 203, 204, 68; 709/213, 246; 717/174; 711/165
  See application file for complete search history.

(56) References Cited

U.S. PATENT DOCUMENTS

| | | | |
|---|---|---|---|
| 5,155,847 | A | 10/1992 | Kirouac et al. |
| 5,832,522 | A | 11/1998 | Blickenstaff et al. |
| 5,930,806 | A * | 7/1999 | Taira et al. ................. 707/204 |
| 5,991,753 | A | 11/1999 | Wilde |
| 6,169,976 | B1 | 1/2001 | Colosso |
| 6,199,204 | B1 | 3/2001 | Donohue |
| 6,237,020 | B1 | 5/2001 | Leymann et al. |
| 6,327,617 | B1 | 12/2001 | Fawcett |

(Continued)

FOREIGN PATENT DOCUMENTS

WO    WO 02/06991 A2    1/2002

(Continued)

OTHER PUBLICATIONS

"Description Scripting Language for Updating and Installing Application Via The Internet" IBM Technical Disclosure Bulletin, IBM Corp. New York, US, vol. 40, No. 6. Jun. 1997, pp. 151-153, XP00728370 ISSN: 0018-8689.

(Continued)

*Primary Examiner*—Don Wong
*Assistant Examiner*—Merilyn P Nguyen

(57) ABSTRACT

A method, system and article of manufacture for data preservation. A method for preserving data during system migration includes determining which files on a computer should not be preserved, preserving all files from the computer not identified by the determining step, performing a system migration on the computer, and downloading the preserved files to the computer. The determining step may determines which files should not be preserved by applying rules that specify which files should not be preserved. A system for preserving data during system migration includes a plurality of workstation computers and a remote site server connected to the plurality of workstation computers. Each workstation computer includes a plurality of files. The remote site server includes a processor that executes instructions on a memory, the memory including instructions for preserving data during system migration.

21 Claims, 13 Drawing Sheets

U.S. PATENT DOCUMENTS

| | | |
|---|---|---|
| 6,345,386 B1 | 2/2002 | Delo et al. |
| 6,625,622 B1 | 9/2003 | Henrickson et al. |
| 6,889,249 B2 * | 5/2005 | Miloushev et al. ......... 709/213 |
| 6,938,039 B1 * | 8/2005 | Bober et al. .................... 707/8 |
| 6,981,005 B1 * | 12/2005 | Cabrera et al. ............. 707/203 |
| 2002/0049925 A1 | 4/2002 | Galipeau et al. |
| 2002/0100036 A1 | 7/2002 | Moshir et al. |
| 2002/0107809 A1 | 8/2002 | Biddle et al. |
| 2002/0133619 A1 | 9/2002 | Lin et al. |
| 2002/0174329 A1 * | 11/2002 | Bowler et al. ................. 713/1 |
| 2003/0061170 A1 | 3/2003 | Uzo |
| 2003/0078853 A1 | 4/2003 | Peinado et al. |
| 2004/0187104 A1 * | 9/2004 | Sardesai et al. ............ 717/174 |

FOREIGN PATENT DOCUMENTS

WO     WO 02/065283 A2     8/2002

OTHER PUBLICATIONS

PCT/US2004/012804, International Search Report and Written Opinion dated Mar. 29, 2006.

PCT/US2004/012805, International Search Report and Written Opinion dated Mar. 31, 2006.

European Application No. 04760391.5, Supplementary Partial Search Report dated Jun. 27, 2007.

* cited by examiner

| COLUMN NAME | DESCRIPTION | DATA SOURCE | EXAMPLE |
|---|---|---|---|
| SITENAME | THE SITE CODE OF THE OFFICE WHERE THE MACHINE IS USED. | AGENT | CHI |
| EUPNAME | COMMON USE NAME ASSOCIATED WITH A PARTICULAR EUP MANAGERS GROUP. | END USER DIRECTORY | EUP_IT_PROD |
| EUPBUSINESSLINE | BUSINESS LINE THAT IS ASSIGNED TO THE EUP MANAGER. | END USER DIRECTORY | IT MESSAGING |
| MANACSFUNCTION | THE ROLE OF THE PERSON WITHIN THE BUSINESS LINE. | END USER DIRECTORY | IT MESSAGING GSD |
| WORKSTATIONID | THE MACHINE'S COMPUTER NAME. | AGENT | W6577777 |
| PRIMARYUSER | THE USERNAME OF THE PERSON WHO USES THE COMPUTER MOST OFTEN. | AGENT | YEOWWP |
| PRIMARYUSEROVERRIDE | INDICATES WHETHER OR NOT A PRIMARY USER HAS BEEN SELECTED IN THE AGENT CONSOLE. A PRIMARY USER MUST BE SELECTED IN THE CONSOLE FOR THE MACHINE TO MIGRATE. | AGENT (ENTERED INTO AGENT BASED ON INPUT FROM END USER) | FALSE |
| PRIMARYUSERVERIFY | (OPTIONAL) THIS COLUMN ALLOWS END USER TO VERIFY THAT PRIMARY USER IS CORRECT. ONLY USED FOR REPORTING PURPOSES. | ENTERED DIRECTLY INTO SPREADSHEET BY END USER. | YEOWWP |
| PRIMARYUSERVALID | INDICATES WHETHER OR NOT THE PRIMARY USER FROM AGENT IS THE SAME AS THE PRIMARY USER LISTED IN PRIMARYUSERVERIFY. TRUE INDICATES THAT THE VALUES ARE THE SAME, FALSE INDICATES THAT THE VALUES ARE DIFFERENT. | CALCULATED WHEN THE REPORT IS GENERATED FROM PSM. | TRUE |

*FIG. 7A*

| | | | |
|---|---|---|---|
| SCHEDULEDMIGRATION DATE | THE DATE WHEN THE MACHINE WILL BE MIGRATED. | PSM | 9-DEC-02 |
| REQUESTEDMIGRATION DATE | THE DATE ON WHICH END USER WANTS THE MACHINE MIGRATED. THIS IS THEN USED TO CREATE A RULE IN PSM THAT THE SPECIFIED MACHINE MUST MIGRATE ON THE DATE IN THIS COLUMN. | ENTERED DIRECTLY INTO SPREADSHEET BY END USER. | 01-APR-03 |
| DATEVALID | INDICATES WHETHER OR NOT THE SCHEDULEDMIGRATIONDATE AND REQUESTEDMIGRATIONDATE VALUES ARE THE SAME. TRUE MEANS THE DATES ARE THE SAME, FALSE MEANS THAT THE DATES ARE DIFFERENT. | CALCULATED WHEN THE REPORT IS GENERATED FROM PSM. | FALSE |
| GPIN | THE PRIMARY USER'S EMPLOYEE IDENTIFICATION NUMBER WITH ANY LEADING ZEROS REMOVED. | END USER DIRECTORY | 720001728 |
| FIRSTNAME | THE PRIMARY USER'S FIRST NAME. | END USER DIRECTORY | WERN PHEI |
| LASTNAME | THE PRIMARY USER'S LAST NAME. | END USER DIRECTORY | YEOW |
| INTERNALDIALCODE | THE PRIMARY USER'S INTERNAL DIAL CODE. | END USER DIRECTORY | 19 532 |
| PHONE | THE PRIMARY USER'S PHONE NUMBER. | END USER DIRECTORY | 8484 |
| EMAIL | THE PRIMARY USER'S E-MAIL ADDRESS. | END USER DIRECTORY | WERN-PHEI.YEOW@SW.COM |
| DESKLOCATION | THE LOCATION OF THE PRIMARY USER'S DESK. THIS INFORMATION IS NOT USED BY PSM. THIS COLUMN IS PROVIDED FOR END USER'S CONVENIENCE. | ENTERED DIRECTLY INTO SPREADSHEET BY END USER. | 12W445 |
| LOCATION | AN ADDRESS OR OTHER DESCRIPTION OF THE BUILDING WHERE THE PRIMARY USER IS LOCATED. | END USER DIRECTORY | SUNTEC TOWER 5 |

*FIG. 7B*

| | | | |
|---|---|---|---|
| CITY | THE CITY WHERE THE PRIMARY USER IS LOCATED. | END USER DIRECTORY | SINGAPORE |
| MACHINETYPE | INDICATES WHETHER A MACHINE IS A LAPTOP OR A DESKTOP. "L" INDICATES LAPTOP AND "W" INDICATES DESKTOP (I.E. WORKSTATION). | CALCULATED BASED ON THE FIRST CHARACTER OF THE VALUE IN THE WORKSTATIONID COLUMN. | W |
| MANUFACTURER | THE NAME OF THE MACHINE'S MANUFACTURER. | AGENT | DELL COMPUTER CORPORATION |
| PRODUCT | THE MACHINE'S MODEL. | AGENT | OPTIPLEX GX240 |
| BIOSVENDOR | THE NAME OF THE BIOS MANUFACTURER. | AGENT | DELL COMPUTER CORPORATION |
| BIOSVERSION | THE VERSION NUMBER OF THE MACHINE'S BIOS. | AGENT | A02 |
| BIOSDATE | THE RELEASE DATE OF THE BIOS. THERE MAY BE IMPROPER DATES SHOWN IN HTIS COLUMN DUE TO HOW WMI IS IMPLEMENTED BY DIFFERENT MANUFACTURERS. | AGENT | 6-DEC-02 |
| RAM | THE AMOUNT OF MEMORY INSTALLED ON THE MACHINE. | AGENT | 1022 MB |
| REMOTESERVER | THE NAME OF THE RSS THAT THE MACHINE IS ASSIGNED TO. | AGENT | XSNG1903PJS |
| VALID | WHETHER OR NOT THE MACHINE PASSES THE REQUIREMENTS TO QUALIFY IT FOR MIGRATION. | AGENT | FALSE |

*FIG. 7C*

| VALIDATIONOVERRIDE | IF TRUE, THE MACHINE WILL MIGRATE REGARDLESS OF WHETHER OR NOT IT PASSES THE REQUIREMENTS TESTS. | AGENT | FALSE |
|---|---|---|---|
| DONOTMIGRATE | IF TRUE, THE MACHINE WILL NOT BE MIGRATED EVEN IF IT PASSES THE REQUIREMENTS TESTS. | ENTERED DIRECTLY INTO SPREADSHEET BY END USER | FALSE |
| HARDWAREREFRESH | INDICATES WHETHER OR NOT THE MACHINE WILL BE "REFRESHED" (I.E. REPLACED WITH A NEW MACHINE) AT MIGRATION. | AGENT (ENTERED INTO AGENT BASED ON INPUT FROM END USER) | TRUE |
| EQUITYHARDWAREREFRESH | USED BY END USER. DOES NOT IMPACT ANYTHING IN PSM OR AGENT. | ENTERED DIRECTLY INTO SPREADSHEET BY END USER. | FALSE |
| NEWMACHINEBAND | FOR HARDWARE REFRESH MACHINES, SHOWS THE KIND OF MACHINE THAT WILL REPLACE THE MACHINE TO BE REFRESHED. DOES NOT IMPACT ANYTHING IN PSM OR AGENT. | ENTERED DIRECTLY INTO SPREADSHEET BY END USER. | DELL PRECISION 350 |
| HARDWAREREMEDIATION REQUIRED | INDICATES WHETHER OR NOT THE MACHINE REQUIRES REMEDIATION IN ORDER TO QUALIFY FOR MIGRATION. THIS COLUMN IS NOT TIED TO AGENT VALIDATION AND DOES NOT IMPACT PSM OR AGENT. | ENTERED DIRECTLY INTO SPREADSHEET BY END USER. | TRUE |
| HARDWAREREMEDIATION DATE | THE DATE BY WHICH REMEDIATION WILL BE COMPLETE. THIS IS USED TO GENERATE THE MACHINE READY DATE IN PSM. | ENTERED DIRECTLY INTO SPREADSHEET BY END USER. | 4-MAR-2003 |
| ADMINRIGHTSREQUIRED | INDICATES WHETHER OR NOT THE PRIMARY USER WILL REQUIRE LOCAL ADMINISTRATOR RIGHTS ON THE MIGRATED MACHINE. THIS IS USED PRIMARILY FOR DEVELOPERS. DOES NOT IMPACT ANYTHING IN AGENT OR PSM. | ENTERED DIRECTLY INTO SPREADSHEET BY END USER. | FALSE |

*FIG. 7D*

METHODS AND APPARATUS FOR DATA PRESERVATION AND SOFTWARE DISTRIBUTION WITHIN AN ENTERPRISE SYSTEM

RELATED APPLICATIONS

The present application incorporates by reference and claims the priority of U.S. Provisional Application No. 60/465,121, entitled "Method, System and Article of Manufacture for Data Preservation and Automated Electronic Software Distribution Across an Enterprise System," U.S. Provisional Application No. 60/465,118, entitled "Automated Electronic Software Distribution Method," and U.S. Provisional Application No. 60/465,122, entitled "Software Distribution Management System," all filed Apr. 24, 2003. The present application also incorporates by reference co-pending U.S. patent application Ser. No. 10/831,323, entitled "Automated Electronic Software Distribution and Management Method And System," and filed on Apr. 26, 2004.

BACKGROUND

Data preservation is important when migrating computers or computer-based devices from one operating system (OS) to some later version or even to a different physical machine. It is also imperative in the deployment of software onto computing devices. The impact of an OS migration is typically the reformatting or repartitioning of the local hard drive on the computer, resulting in a loss of data stored on the hard drive. To prevent the loss of these data, the files on the hard drive can be backed up and stored elsewhere, for example, on a networked server, prior to the updating of the OS. However, preserving all files residing on the computing device results in unnecessary use of server and client disk space, and drastically slows down the migration process. This can be particularly problematic in an enterprise or production environment, where multitudes of computing devices are involved in a migration process.

The present disclosure describes an improved process and system for locating, preserving, and then restoring all local data to a computer hard drive in an efficient manner, without the risk of accidental data loss. As used herein, the terms computer, computing device, computer-based device, etc. are used to refer to any type of computer, such as a personal computer (PC), lap top, personal digital assistant (PDA), workstation, server, cellular phone or other wireless device, or the like.

Conventional methods employed to preserve user files are data-inclusive. In other words, data is identified by some positive test, such as the file's extension or directory path. For example, a data preservation template may specify that all files should be preserved that have file names ending in .DOC, .XLS, and MDB, in addition to any files found in a user's C:\Data directory. The files having the specified extensions are then included in the data to be preserved during the migration process.

One product, Desktop DNA, available from Miramar Systems, uses this approach on a per-application basis. For example, a Desktop DNA template created for Lotus Notes data preservation might identify files ending in NSF and .NTF. Other commercially available products that approach data preservation in the same way include PTPro available from Tranxition, PC Transplant Pro available from Altiris, and Aloha Bob available from Eisenworld.

A sample screen from Altiris' PC Transplant Pro is shown in FIG. 1. This configuration utility allows an administrator to preserve Adobe Acrobat ties based on their .FDF and .PDF extension, or Visio 2000 files based on their .VSD and .VSS extension.

In addition to preservation by file extension, current migration toolsets allow preservation by directory. Typically, information service (IS) departments ask users to save their local data files to a specific-folder, such as C:\Data or C:\My Documents. Conventional methods of data preservation allow an administrator to mark this type of directory to be preserved.

Although useful in some situations, identification of data by file extension or parent directory suffers from several disadvantages:

A user can apply any file extension to a data file. For example, despite the use of. .DOC as the default extension for Microsoft Word documents, a user may name a very important file with a .SAV extension. Conventional data preservation methods would miss this file.

A user can save a data file to any directory, despite expectations that data will only be found in a standard location. For example, a user may create a local directory called C:\Keyfiles and save all his/her data files here. Traditional data preservations would miss this directory and it would be lost during an OS migration.

The data-inclusive approach requires knowledge of all possible applications that might have data files to be preserved. Traditional preservation methods match file extensions, which are application-specific. This can cause problems if an application is not known prior to the migration. For example, a custom or unidentified application might save files with an ABC extension, all of which would be lost in a migration.

A user can save a data file in a compressed archive. For example, a user may compress data files into a ZIP compressed archive file. Traditional data preservations would miss these files because they would not open the compressed archive looking for data of a particular extension.

SUMMARY

A method, system and article of manufacture for data preservation overcome the disadvantages described above. A method for preserving data during system migration includes determining which files on a computer should not be preserved, preserving all files from the computer not identified by the determining step, performing a system migration on the computer, and downloading the preserved files to the computer. The determining step may determines which files should not be preserved by applying rules that specify which files should not be preserved.

A computer readable medium includes instructions for preserving data during system migration, by determining which files on a computer should not be preserved, preserving all files from the computer not identified by the determining step, performing a system migration on the computer, and downloading the preserved files to the computer. The instructions may further include instructions for generating a rule set that includes a plurality of rules. The determining step may determines which files should not be preserved by applying the rule set.

A system for preserving data during system migration includes a plurality of workstation computers and a remote site server connected to the plurality of workstation computers. Each workstation computer includes a plurality of files. The remote site server includes a processor that executes instructions on a memory, the memory including instructions for preserving data during system migration by determining which files on the workstation computers should not be preserved, preserving all files from the workstation computers not identified by the determining step, performing a system migration on the workstation computers, and downloading the preserved files to the workstation computers.

DESCRIPTION OF THE DRAWINGS

FIGS. 7A-7D is a spreadsheet including details about a machine scheduled for migration.

DETAILED DESCRIPTION

Using the system described herein, application software can be distributed, updated and repaired in an automated fashion over an enterprise network, without manually loading software onto each device 20. In addition, enterprise-wide deployments of applications and/or migrations of OS's can be achieved in a relatively convenient and efficient manner, without the loss of preexisting data files resident on the computers.

The novel and improved data preservation technique disclosed herein takes the opposite approach to data preservation. Rather than preserving what is believed to be data (data-inclusive), the innovative approach disclosed herein preserves files that are identified as not being a system or application file (application-exclusive). Files that are part of the application set, core operating system, service packs, base image, and so on, are not preserved in the application-exclusive approach.

Figure 1:
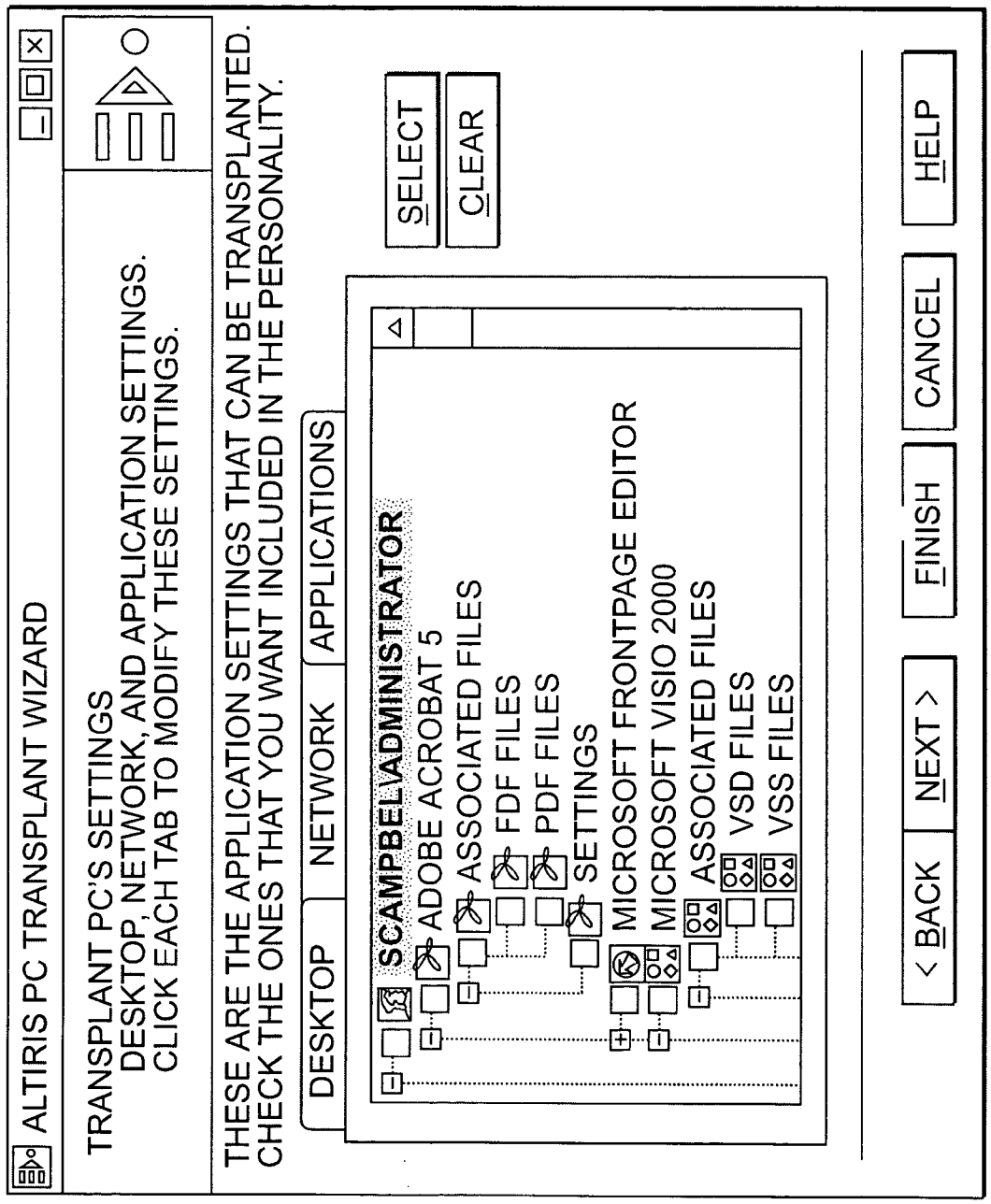
FIG. 1 is a screen shot from an existing data preservation product.
Figure 2:
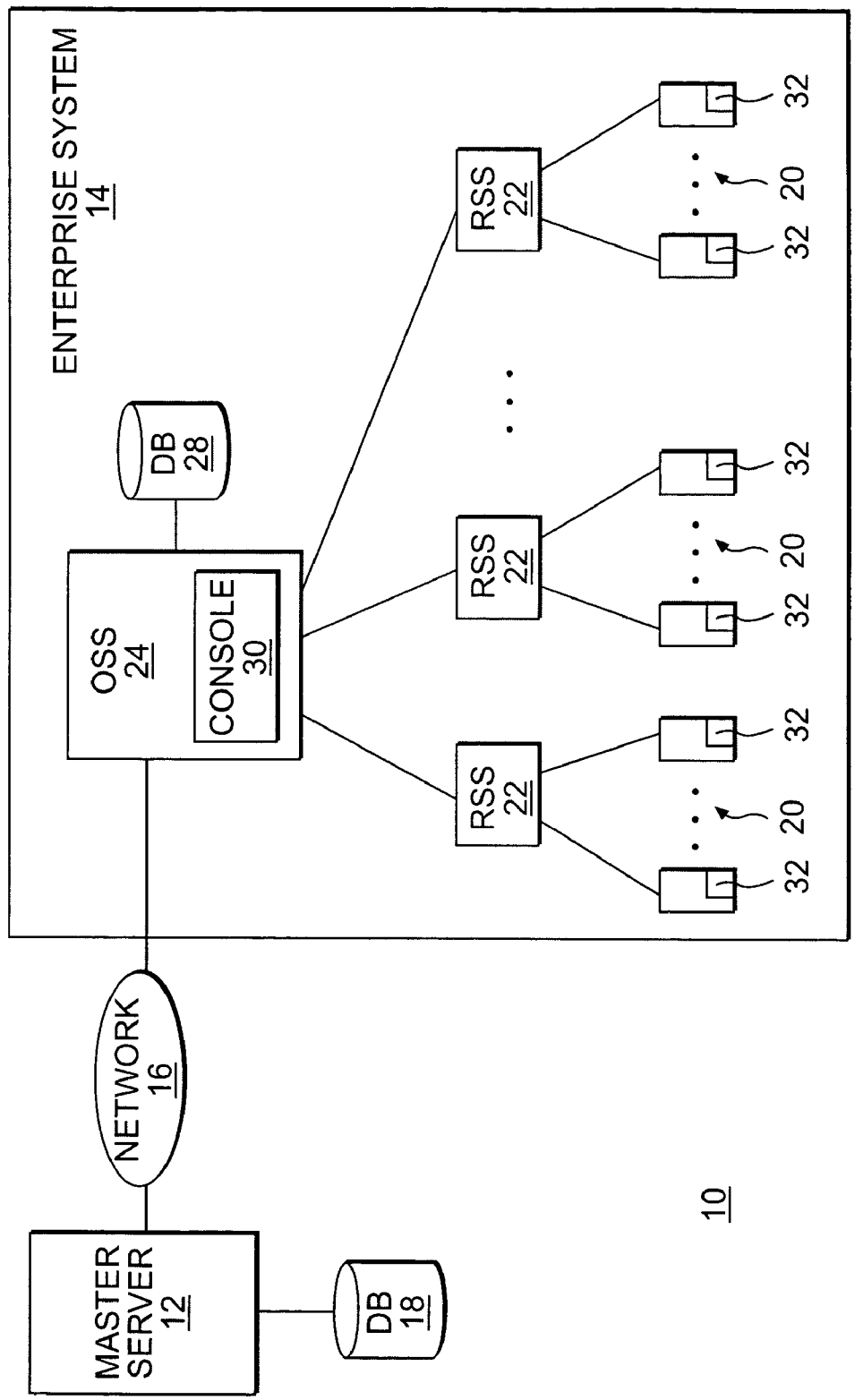
FIG. 2 is a block diagram illustrating an embodiment a system for data preservation.

FIG. 2 is a block diagram of an enterprise-wide system 10 that implements an application-exclusive data preservation process for the purpose of performing an OS migration on a multitude of computers. Accordingly, the system 10 includes instructions (e.g., in the form of a program) that performs the methods and steps (see, e.g., FIGS. 3 and 6) described herein. These instructions are stored in the memory and/or secondary storage (e.g., hard drive, CD-ROM, DVD-ROM) and executed by processors of the various computers or servers (e.g., remote site servers, onsite servers, master server) described herein. Programs incorporating the instructions may include modules and sub-modules corresponding to various steps and groups of steps described herein.

The system 10 architecture shown includes four levels:

Level 1 is the Master Server 12. Software updates and instructions on how to distribute the updates are published to the Master Server 12. The updates and instructions are passed to one or more onsite servers (OSSs) 24 for distribution.

Level 2 consists of OSSs 24 hosted by the enterprise. Each OSS 24 manages a group of related remote site servers (RSSs) 22.

Level 3 is the RSSs 22. The RSSs 22 control the agents 32 on a given—network segment. Computers 20 connect to the RSSs 22 to receive instructions about how and when to install updates. Unlike the OSSs 24, the RSSs 22 usually do not exist as stand-alone dedicated servers. Instead, the RSS 20 software is usually installed on a pre-existing group server.

Level 4 is the agent 32. The agent 32 can be Windows 2000 service that runs on each workstation 20. Each agent polls the RSS 22 to check for new updates to install.

The agent 31 can also run on the OSS 24 and the RSSs 22. When running on an OSS or RSS, the agent 32 is used to update deployment system software on these servers.

The system 10 includes a remote master server 12 connected to an enterprise information services (IS) system 14 by way of a computer network 16, such as the Internet. Although not shown, the master server 12 can be connected to more than one enterprise IS system 14. In such a configuration, each enterprise IS system could be a separate campus within a larger organization, such as a geographically diverse corporation or government entity.

The remote master server 12 generally acts as a redundant backup system to the OSS 24 located within the enterprise IS system 14. Connected to the maser server 12 is a database 18 for storing information and data files relevant to the process of preserving data stored on managed computers within enterprise IS system 14.

The purpose of the OSS 24 is to hold a database 28 that contains information about individual computing devices 20 such as their disk size, memory, last user, IP address, and the like. Secondly, the OSS database 28 is where "entitlements" are stored, that is, associations between devices 20 and application software that is permitted to be loaded on the devices 20. The entitlements can be represented as database records that associate application software program(s) with the computers 20 based on a device identifier and a user login identifier. The entitlements for a particular managed device can be set by a user via the console 30. When a computer 20 is entitled to a software product, as indicated by the OSS 24, the agent polls (from 32 to 22 to 24 to 28, in FIG. 2), and retrieves its entitlement. The software package indicated by the entitlement, which is stored on the RSS 22, is then downloaded directly from the RSS 22 to the computer 20.

In addition, during a migration entitlement, the RSS 22 is used not only to host the software package that performs the migration as described herein, but to temporarily hold computer data that is to be preserved, as specified by the rule-processing algorithm. The data is located at the RSS 22 and no higher, since the RSS 22 is on the LAN, and the OSS 24 is typically across a slower network connection.

The enterprise IS system 14 includes a plurality of computing devices 20. The devices 20 can include various types of computers, such as conventional desktop personal computers (PCs), portable computers (notebooks, laptops), workstations, computer network servers or any other device that has embedded software and is capable of networked communication. Each computer 20 includes conventional computer components, such as a processor, random access memory (RAM), one or more local hard drives, OS software, application software, data files, network interface hardware and software, and the like. Preferably, each computer runs a Windows® OS available from Microsoft® Corporation.

The computers 20 are organized into groups, with each group being networked to a corresponding RSS 22. Typically, the RSS 22 and its corresponding devices 20 are connected together by a conventional local area network (LAN), such as Ethernet, to permit communication and transfer of data files. The grouping of the devices 20 and hierarchical structure of the enterprise system 14 permits parallel execution of the migration process or software deployment among the computers.

The RSS's 22 are networked to an onsite server (OSS) 24 using a commercially-available LAN or wide area network (WAN). The OSS 24 is a centralized server that is configured to initiate and control a migration or deployment to the managed computers 20 across the enterprise 14. To accomplish this, the OSS 24 includes, among other things, a browser console 30 and is connected to an onsite database 28.

The browser console 30 is a web browser application that permits a user to enter commands that control the data preservation, migration or application deployment process. The console 30 also provides processing status and reports to the user, and permits the user to set entitlements.

The database 28 stores entitlements, and can also store other information used for data preservation and migration.

Figures 3A, 3B:
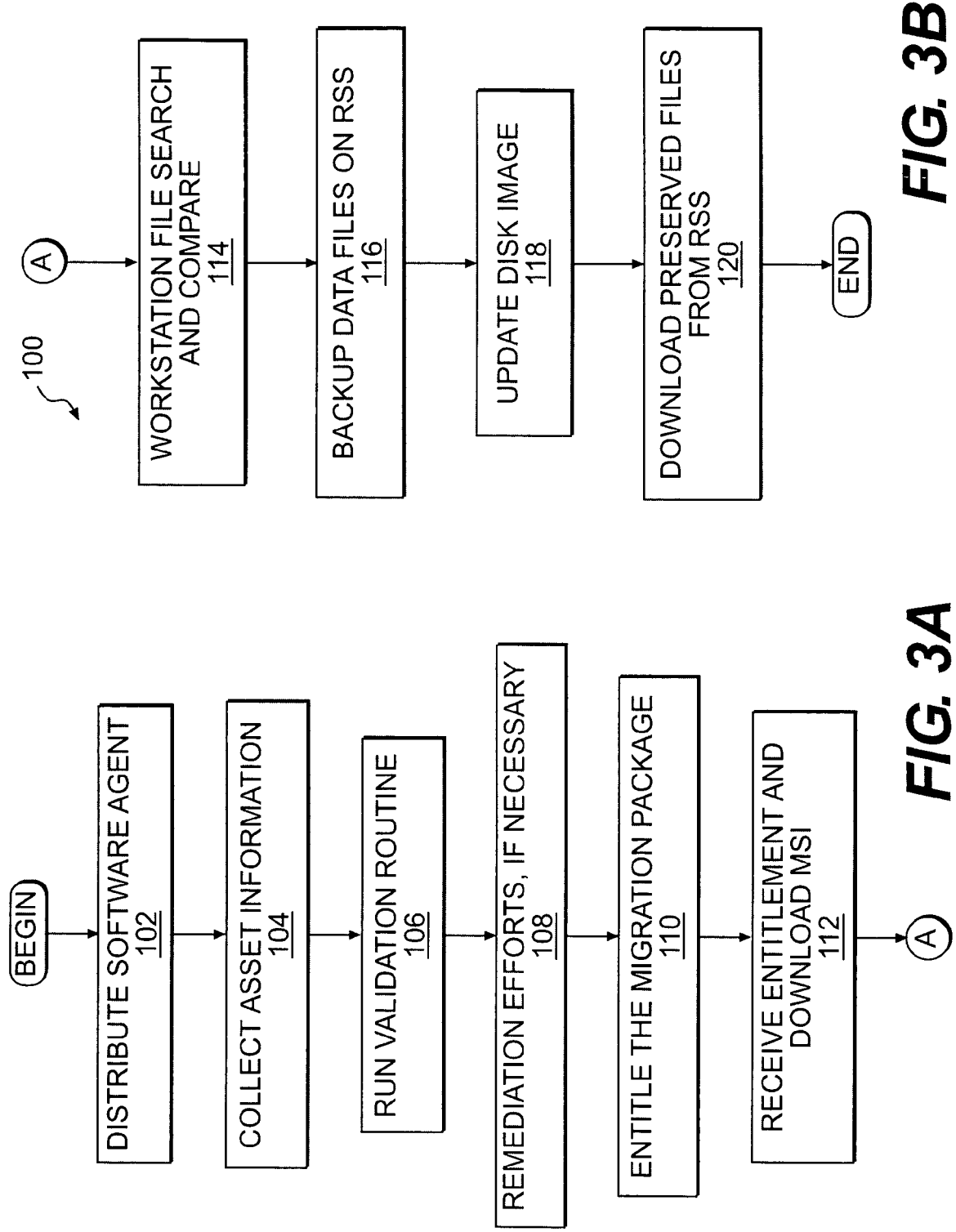
FIG. 3A is a flowchart illustrating a method for distributing data preservation software.
FIG. 3B is a flowchart illustrating a method for data preservation during migration.

The operation of the enterprise system 14 during a migration or deployment is depicted by the flowchart 100 of FIGS. 3A and 3B. The typical migration process is as follows. In step 102, the software agent 32 is distributed across the enterprise networks to the computing devices 20. Typically, the agent 32 is downloaded to the managed computer from a networked server in response to a network login script executed by each computer. The login script can include a path designating the location of the agent software to be downloaded. Alternatively an email attachment or URL link, remote scripting, or other ESD (Electronic Software Delivery) system can be used to distribute the agent 32. When the agent 32 is installed, an icon can appear in the Windows System Tray of the computer (for computers running Windows®). The color of the icon indicates the agent's status:

Green—The agent is idle.

Yellow—The agent is performing a task.

Red—The agent has failed to complete a task. The agent icon can be double-clicked to see detailed information.

After being downloaded and installed on the computers 20, the asset discovery and inventory process commences whereby the agents 32 collect asset information for each computer to be reported to the OSS database 28 via an RSS 22 (step 104). The asset information includes end-user computer hardware and software characteristics, such as memory size, processor type and speed, resident software, and the like.

With continued reference to FIG. 3A, after returning the asset information to the OSS 24, the agent 32 begins a polling routine in which it periodically polls the OSS 24 via an RSS 22 to check for its entitlement. The polling is accomplished using a hypertext transfer protocol (HTTP) GET command sent to the OSS 24 via the RSS 22 from the computer. The command provides a device identifier and user login identifier to the OSS 24. The polling period is parameterized and can be set by a user at the console 30. The period is typically ten minutes between polls.

As asset information is collected globally (perhaps over a period of several weeks), a validation routine is run by the OSS 24 (step 106). This routine compares the list of supported hardware and minimum computer requirements to the individual asset inventory information gathered by the agents 32 about the computers 20. As a result of this comparison, the OSS 24 identifies computers that are "valid" for migration, and those that are "invalid", i.e., lack the minimum required hardware or software required to carry out the migration.

Next, in step 108, for invalid computers, remediation efforts can be undertaken either to create newly supported hardware device records in the OSS database 28, or to replace unsupported hardware devices in the local computers. To add newly supported hardware, a user updates the list of supported hardware devices via the browser console 30. Replacing unsupported hardware generally requires the user to manually access the individual computer 20 to physically remove the unsupported device.

For valid computing devices, using the browser 30, the user entitles the migration package at the OSS database 28 (step 110). This package is wrapped in a Microsoft Windows Installer (MSI) file and stored on the RSS 22. The MSI wrapper permits the package to install automatically on the computer upon download.

With continued reference to FIG. 3A, when the agent 32 polls next, it receives a response indicating the location of its entitlement. The response can include a Java wrapper having a script that gives a path as to where the MSI file resides on the RSS 22. The computer 20 then downloads the MSI from the RSS 22, and begins the migration process (step 112).

The MSI wrapper can include a script for performing one of three entitlement functions: 1) It can repair an existing application on the computer 20 through a process known as self-healing whereby the application repairs its own defects, 2) It can install entitled applications as part of a migration, and 3) It can uninstall applications. The MSI having the desired entitlement function can be selected for a particular computer by user via the console 30.

The agent polls for entitlements indicating new packages, and the downloaded migration MSI contains all the tools, including the rule set object and a rule-processing algorithm, such as the optimized algorithm described herein below, for performing a migration or deployment. When the migration MSI is delivered to a computer 22, the agent 32 interprets the wrapper script and invokes the MSI using Microsoft Windows Installer. The migration MS1 then automatically begins execution.

With reference now to FIG. 3B, during the migration process, all local disk drives on the computer 20 are searched recursively, and each file found on the drive is provided to the rule set object, which compares file properties to the rule set according to the rule-processing algorithm (step 114), as described in further detail below (see FIG. 6). Files determined not to be known application files are marked for backup. Files that match against any rule are considered non-data and are not backed up. These non-data files are wiped from the disk during the image update.

In step 116, the files marked for backup are moved to the RSS 22 for temporary storage. The directory path for each file is also backed up so that the data file directory structure of the computer 20 is also preserved.

Next, in step 118, the disk image of the computer hard drive is updated to include the new OS. Any files not backed up on the RSS 22 are lost, including the agent 32. Once the computer reboots with the new image, the agent and migration MSI are automatically reinstalled using scripts embedded in the imaging process, allowing the migration MSI to complete the migration. Finally, in step 120, the data files preserved on the RSS 22 are downloaded back onto the computer disk. The migration package then notifies the OSS 24 of the successful completion of the migration process for the particular computer.

As stated above, the hierarchical structure of the OSS 24 and RSS's 22 allows the migration of a group of computers or deployment of applications to be carried out concurrently with the migrations of other groups.

Application-Exclusive Rule Sets

Application files are (generally) not modified by users and, therefore, do not contain any user data. Application files, like most other files stored on a computer, are known by any combination of one or more of the following properties:

file name,
file date,
file time,
file size, and
parent directory.

For example, file name NOTEPAD.EXE file date Aug. 30, 2001, file size 66048, is known to be a core Windows XP operating system file.

The identities of application files can be generalized, and collections of files can be designated by specifying wildcards. For example *.EXE, file date Jul. 11, 1995, file time 9:50 AM, corresponds to any file ending in EXE last modified at the given date and time. Files that have these specific properties are known to be core Windows 95 operating system files.

The identity of application files can be derived from original operating system images, as well. If a company decides to migrate from Windows 98 to Windows 2000, for example, the base drive image for the original Windows 98 build on a computer contains a known set of non-data files.

Finally, application file identities can be derived from packages, or groupings of files used to distribute software electronically. Windows Installer, Tivoli, Cognet, Novadigm, and other packaging tools contain file manifests, specifying file name, date, time, size, and directory. Any file with these exact properties is an application file and therefore is not data and does not need to be preserved during an OS migration.

Rule Format

The innovative approach disclosed herein encodes known application files into sets of rules. Rules specify the properties of files known not to be data files. In other words, the rules can be used to specify files that will not be preserved during a migration. The general format of an individual rule is:

Name|Directory|Size|Date|Time

The pipe symbol, | is used to delimit the five fields in a rule. The following rule applies to a file called Calc.exe, in the system directory, with a specific date, time, and size:

Calc.exe|C:\Windows\System32|114688|08/23/2001|07:00 AM

Rules may accept normal wildcard characters, such as "?", which replaces one and only one character, or "*", which replaces zero or more characters. The following rule applies to any file called Calc.exe, in any subdirectory of the C:drive:

Calc.exe|C:\*|114688|08/23/2001|07:00 AM

Common variables, such as the Windows directory, the Windows system directory, the Program Files directory, and so on, may also be used in rules, so long as the variable is framed by the % sign. As an example, the following rule matches the Calc.exe file only in the system directory:

Calc.exe|% WINSYSDIR %|114688|08/23/2001|07:00 AM

A rule does not need to specify all properties to match a file. If one or more properties is not supplied for a rule, the rule implies that that property is not tested, or in other words, that any value would match the property. As an example, the following rule applies to all files called Calc.exe in the system directory, regardless of file size, date, or time.

Calc.exe|% WINSYSDIR %

In addition, a rule may be written to apply to files of a certain date and time, irrespective of their directory location, name or size. For example, the following rule identifies all files having a date of Aug. 23, 2001 and a time of 7:00 A.M.:

08/23/2001|07:00 AM

Rule Set Generation

Rule generation is the process of creating a set of rules that can be used for file exclusion (e.g., step 114 discussed above). As noted above, rules can be derived from a number of sources, including:

An enumeration of all files in a default base operating system build
An enumeration of all files in a base disk image
An extraction of all files from software package or application manifests
A set of custom rules based on customer or enterprise policies
Programmatic scanning of fresh workstation images.

The final result of rule generation is a list of rules that can be organized by application or source, then saved as a single text file or set of files. Depending on the enterprise environment, the number of rule files may range from the tens of thousands to many hundreds of thousands.

The generation of a rule file can be performed at a remote location, and the rule file can be tested before being released to the production or enterprise environment.

Application of Rules to Computer Files

During a migration, computer files are tested and backed up prior to the deployment of a new disk image. All local disk drives are searched recursively, and each file found on the drive is compared to the rule set. Files not found to be known application files are marked for backup. Files that match against any rule are considered non-data and are not backed up. These non-data files are wiped from the disk during the image update.

Rule-Processing Algorithm

Due to the large number of potential rules (as many as hundreds of thousands) and the large number of potential computer files (potentially hundreds of thousands or more) to compare against, optimization of rule-processing is a concern.

A general rule-processing algorithm builds the file list into an array F( ) and the rule list into an array R( ). Doing a one-to-one comparison, the number of operations needed to compare all the files against all the rules would be:

$$\text{No. of operations} = F \times R,$$

where F=the number of files and R=the number of rules in the set. This generalized approach requires a relatively large amount of processing time to complete a computer migration.

To improve on the generalized processing algorithm, the novel data preservation process disclosed herein divides rules into two types: explicit rules and wildcard rules.

Figure 4:
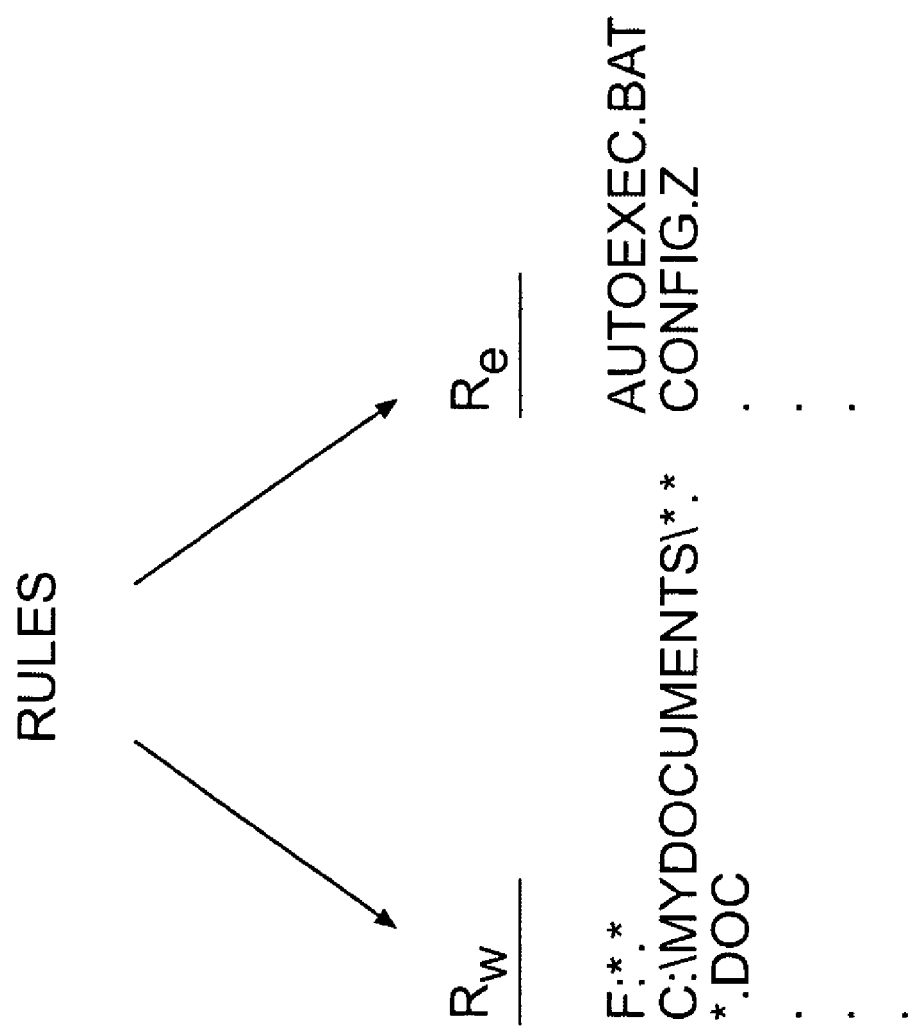
FIG. 4 is a diagram illustrating different types of rules used in a method for data preservation.

Explicit rules $R_e$ refer to any rule in which the entire file name is known explicitly, without the use of wildcards. Any other property of the file may be explicit, include a wildcard or be left unspecified. The second type of rule is a wildcard rule $R_W$. Wildcard rules refer to any rule in which a wildcard exists in the file name, or any rule in which the file name is not specified at all. Examples of the two categories of rules are shown in FIG. 4.

According to the data preservation process, explicit rules are built into an array $R_e( )$ and wildcard rules are built into a second array $R_w( )$. Without further improvement, the number of rule-processing operations needed to compare all files against all rules would be:

No. of operations=$F \times Re + F \times R_{w1}$ where F=the number of files, $R_e$=the number of rules in the explicit set, and $R_W$=the number of rules in the wildcard set.

The processing of the explicit rules can be exponentially improved using search and sort techniques. First, array $R_e( )$ is sorted by file name. Of course, the array $R_e( )$ also includes information about file path, date, time, and size, but the file name is used as the sorting index.

With a sorted explicit rule array, files can be tested against the rule set much more efficiently. A file is tested against the explicit rule array by starting a binary search of $R_e( )$. For example, given a rule set containing 1000 files and a file name NOTEPAD.EXE, the procedure begins by looking at the value of $R_e(500)$, or half of the total size of the array. The file name at position 500 of the array is found to come before NOTEPAD.EXE, so the procedure next tests the value of $R_e(750)$, or half of the size of the latter half of the array. The file name at position 750 of the array is found to come after NOTEPAD.EXE, so the procedure next tests the value of $R_e(625)$, and so on, until either a match is found or the binary search exhausts all possible index values.

The binary search can process a significant number of rules in only a few steps:

$R_e = 2^x$

Where x+1 is the maximum number of steps (operations) to find the matching target rule (or the lack thereof). The number of steps x can also be expressed:

$x = \log(R_e)/\log(2)$

Once an applicable rule (matching rule) is found for a given file name, the remaining properties of the file are compared to the remaining fields of the rule.

It is noted that multiple rules may have the same file name, i.e., multiple rules may exist for the same file name. This can occur in situations where, for example, different versions of an executable file are included in several different application packages on a computer. Therefore, once a binary search on the explicit file name is complete, the process searches the rule's neighbors both up and down the array to determine if multiple rules are associated with the file name. So, for example, if a file matches the rule at $R_e(y)$, the process searches:

$R_e(y-1)$, $R_e(y-2)$, $R_e(y-3)$, etc. until file name does not match rule, and $R_e(y+1)$, $R_e(y+2)$, $R_e(y+3)$, etc. until file name does not match rule Therefore, the final number of operations required to compare files to rules becomes, approximately:

No. of operations=$F \times (\log(R_e)/\log(2)) + F \times R_w$

No optimization is performed on the right-most side of the processing equation, i.e., file names with wildcards are not sorted and binary searched to produce faster searches: by definition, the search term—file name—is indeterminate.

Generating the Rule Set.

Figure 5:
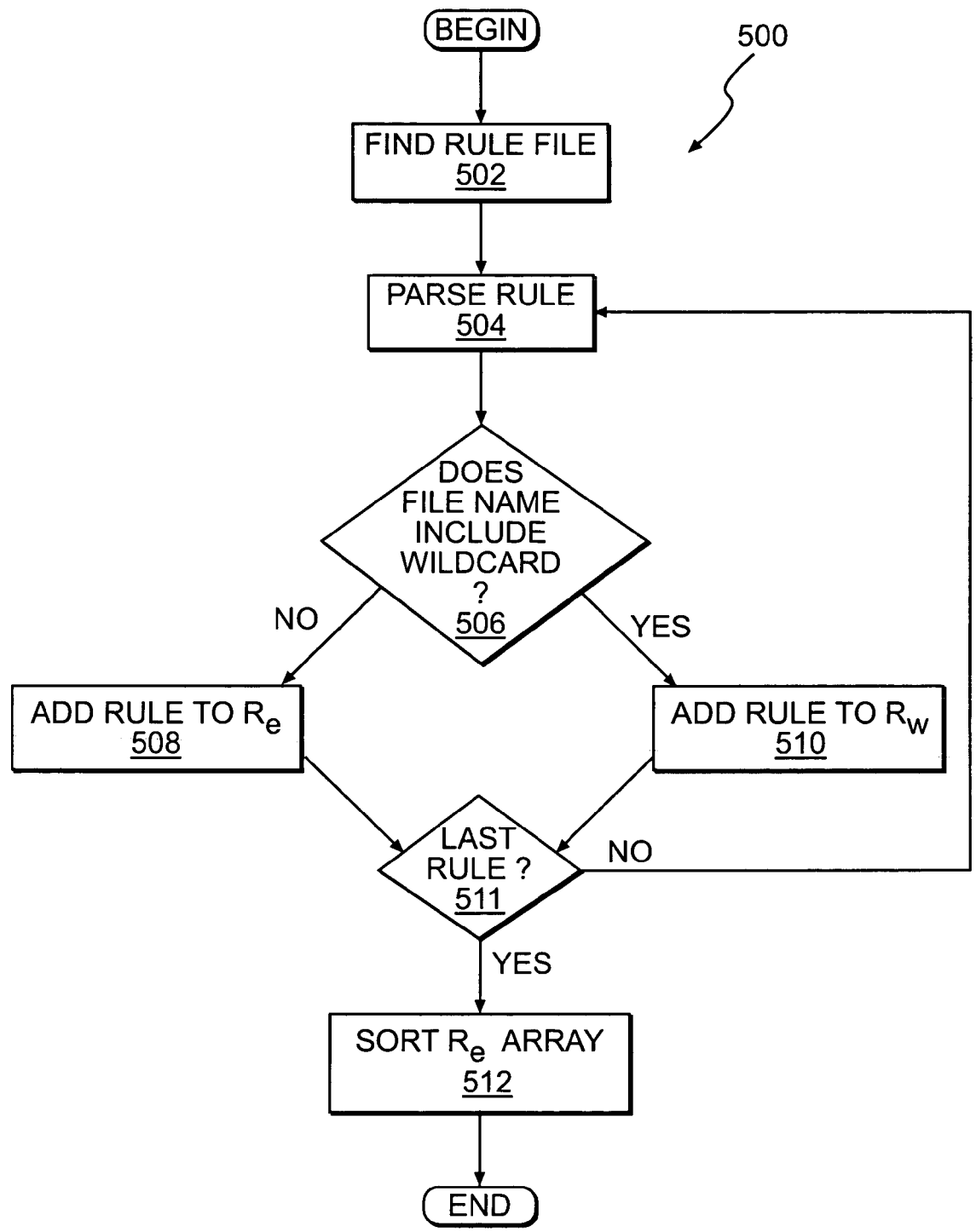
FIG. 5 is a diagram illustrating a method for generating a rule set.

By definition, a rule set is a collection of all rules. The purpose of generating the rule set is to build a single object in memory containing all known rules, optimized for later search operations. A procedure for rule set generation is shown below and given in the corresponding flowchart 500 of FIG. 5:

Find an open text file containing rules (step 502).

Read each rule, parsing the rule (see above section entitled "Rule Format") into its component fields: file name, directory name, file size, file date, and file time (step 504).

Determine if the file name field contains a wildcard (e.g., * or ?) or implies a wildcard (is blank) (step 506).

If the file name field contains a wildcard, add the rule to the wildcard array $R_w$ (step 510).

If the file name field does not contain a wildcard, add the rule to the explicit array $R_e$ (step 508).

Repeat steps 504 through 508 until all rules have been added to $R_w$ and $R_e$ (step 511).

Perform an optimized sort using a standard QuickSort algorithm on array $R_e$, of the five elements of a rule (name, directory, size, date, and time), sort on name (step 512).

Applying the Rule Set

The purpose of rule set application is to build an array of files that must be preserved, because they cannot be excluded as system or application files. Individual files are passed into the rule set, and the rule set object passes back a return code. The recursive search step, step 114 of FIG. 3B, may apply the rule set as described herein. The return code falls into one of three categories:

Return code=0—Indicates that the file matches no rule. The file is considered to be data and is preserved.

Return code>0—Indicates that the file matches a wildcard rule. The file is considered to be an application or system file and is not preserved. The exact return code is the ordinal number of the wildcard rule.

Return code<0—Indicates that the file matches an explicit rule. The file is considered to be an application or system file and is not preserved. The absolute (non-negative) value of the return code is the ordinal number of the explicit rule.

Any individual file can be tested against the rule set, but the general approach is to search all local fixed drives recursively, finding every file and testing each file against the rule set as it is discovered on the drive. When the rule set returns a 0, indicating that the file does not match any rule, that file can be immediately copied to a storage location, such as a remote server, that will be unaffected by the disk image update process. Alternatively, the file name and/or properties can be saved in a separate file for later processing, such as a batch process to compress and save off the files marked for preservation.

Internal Rule Processing

FIGS. 6A-6D illustrate an exemplary method 60 of recursive file searching. As described above, the rule set object contains two arrays: an array of wildcard rules $R_w$ and an array of explicit rules $R_e$. When a file is compared to the rule set, all of the relevant file properties (name, directory, size, date, and time) are passed to the rule set object. As illustrated in FIGS. 6A-6D, the following steps list the actions that the rule set object takes on the input file properties. The recursive search step, step 114 of FIG. 3B, may perform the recursive search per the steps described herein and illustrated in FIGS. 6A-6D.

Figure 6A:
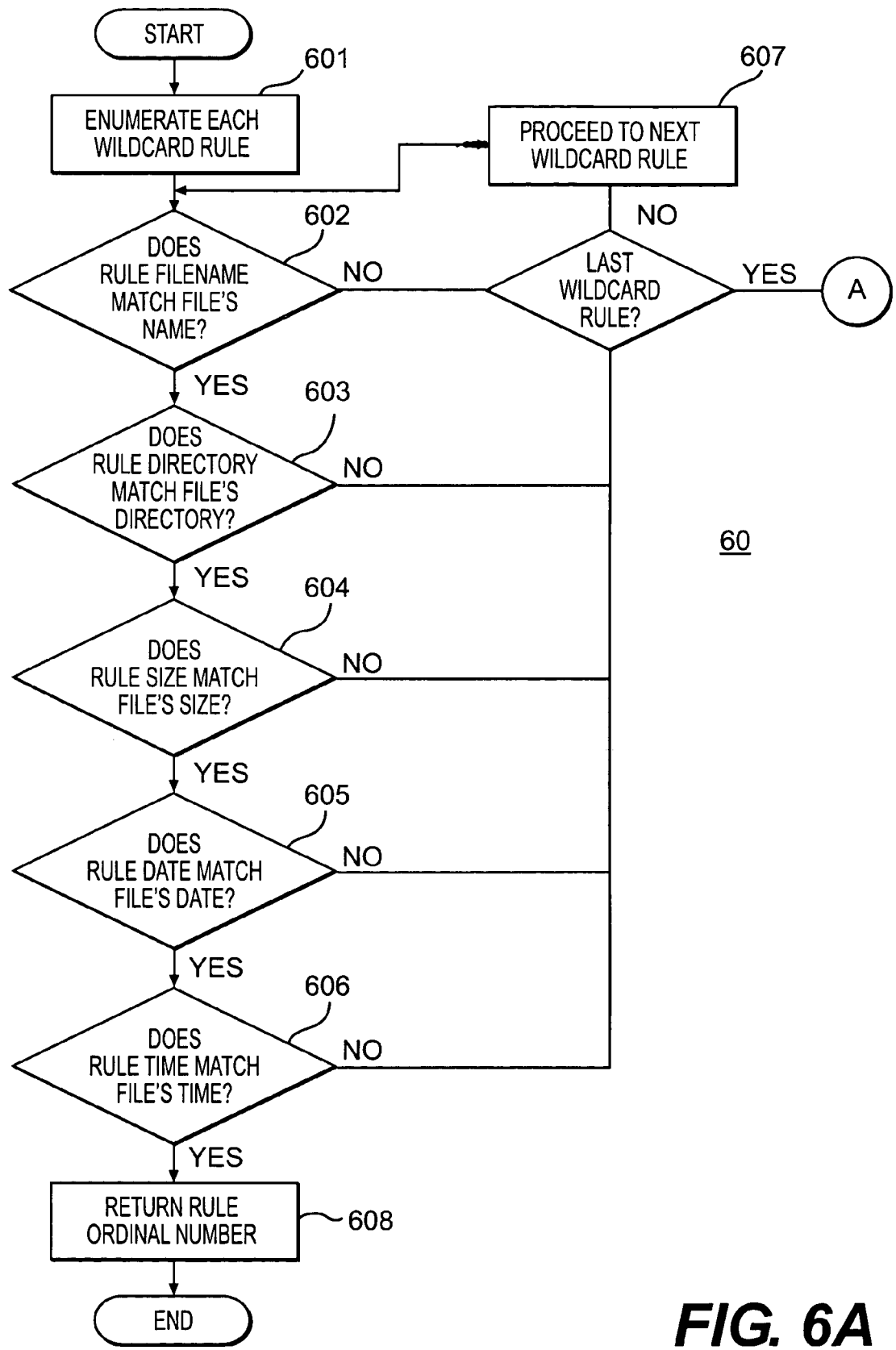
FIGS. 6A-6D is a diagram illustrating a method for recursive file searching used in a method for data preservation.

With reference to FIG. 6A, starting with the wildcard rule array $R_w$, enumerate each wildcard rule (step 601). If the rule's file name does not match the file's name (step 602), proceed to the next wildcard rule (step 607). If the rule's directory does not match the file's directory name (step 603), proceed to the next wildcard rule (step 607). If the rule's size does not match the file's size (step 604), proceed to the next wildcard rule (step 607). If the rule's file date does not match the file's date (step 605), proceed to the next wildcard rule (step 607). If the rule's file time does not match the file's time (see below section entitled "Time comparison") (step 606), proceed to the next wildcard rule (step 607). If all properties compared in step 602 through 606 match, return the wildcard rule ordinal number and processing is exited for the current file (step 608). Per step 114 of FIG. 3B, the method 60 is then repeated for all remaining files.

Figure 6B:
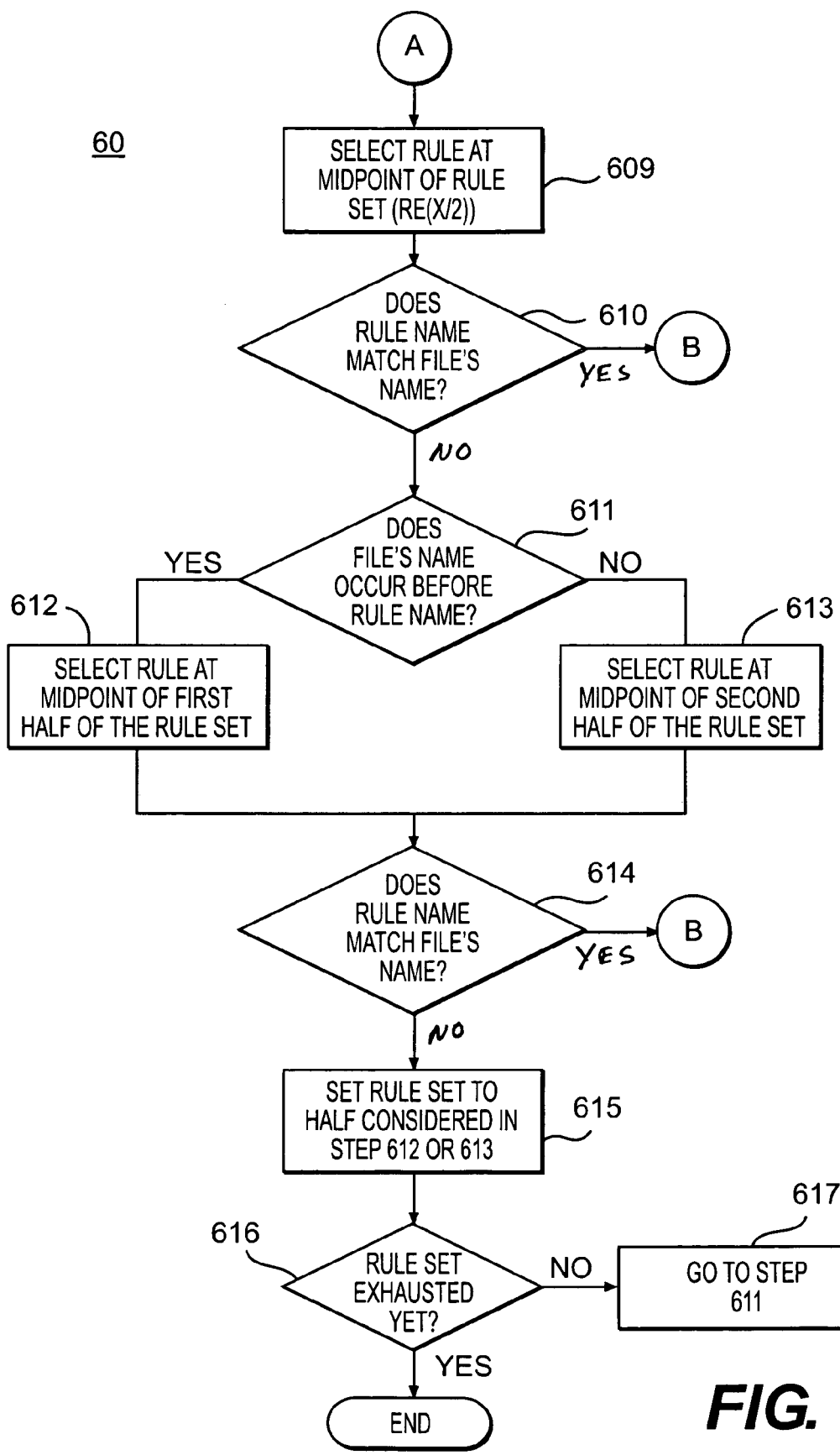

Otherwise, if the wildcard array $R_w$ is exhausted go to the explicit rule array $R_e$, and select the rule at the midpoint of the explicit rule array (e.g., $R_e(x/2)$, where x is the number of elements in the explicit rule array) (step 609), as shown in FIG. 6B. Each element of the array $R_e$ is designated with an integer. Therefore, if the rule set is not an odd number of rules, then x/2 will not be an integer. In this case, the method 60 selects as the midpoint either the rule with the next greater or lesser ordinal number. E.g., if x/2=50.5, the method 60 may select either 50 or 51 as the midpoint. If the selected rule's filename matches the file's name (step 610), go to step 618. Otherwise, determine whether the file's name occurs before or after the file name for rule $R_e(x/2)$. This is accomplished by comparing the textual characters of the file name against those in the rule's file name field (step 611).

If the file's name occurs before the $R_e(x/2)$ rule's file name field (in alphanumeric order), then determine the mid-point index for the first half of the rule set (those rules up to rule $R_e(x/2)$) and select this rule (step 612). If the file's name occurs after the $R_e(x/2)$ rule's file name field, determine the mid-point index for the second half of the rule set (those rules following rule $R_e(x/2)$ in the array) and select this rule (step 613). If the selected rule's filename matches the file's name (step 614), go to step 618. Otherwise, the method 60 continue the binary search algorithm (steps 611-614) until the remaining search domain is just one element or the selected rule's file name matches the name of the file being tested. The method 60 may do this by setting the rule set to the half considered in step 612 or 613 (step 615), determining if the rule set being considered is exhausted (i.e., rule set being considered is reduced to the point at which it cannot be reduced further) (step 616), and, if the rule set is not exhausted, returning to step 611. For example, in a rule set with 21 elements ($R_e(1)$ to $R_e(21)$), step 609 would select the rule at $R_e(11)$. If step 611 determines that the file's name occurs before this selected rule name, step 612 would select the rule at $R_e(6)$ (i.e., the midpoint of the first half of the rule set). If this rule does not match, step 615 would set the rule set to be considered to $R_e(1)$ to $R_e(11)$, step 617 would return to step 611, and if step 611 determined that the file's name occurs after $R_e(6)$, step 613 would select the rule at $R_e(9)$. The method 60 would continue until a match is found or the rule set being considered is exhausted.

Figure 6C:
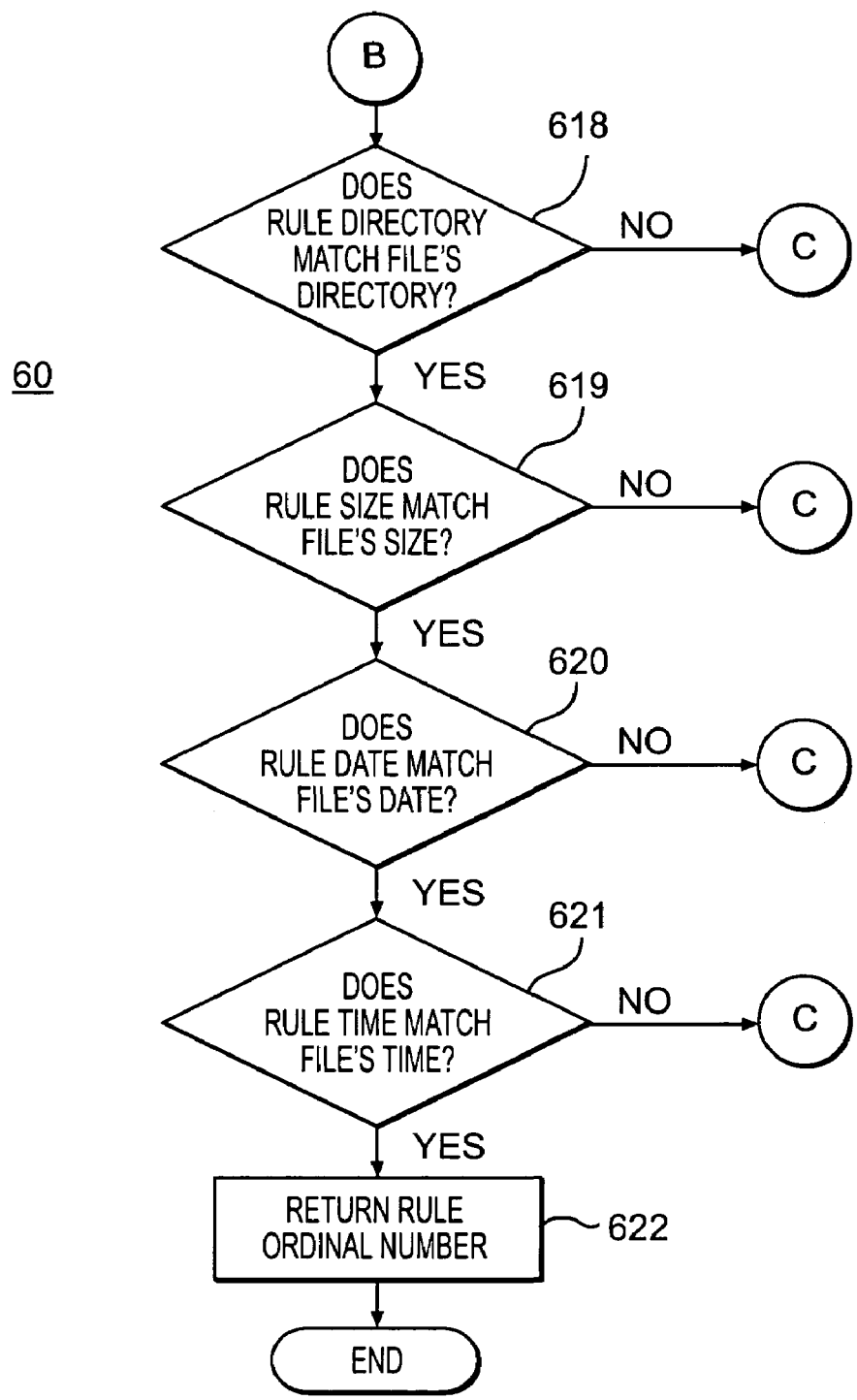

With reference now to FIG. 6C, if the selected rule's file name matches the file's name, the method 60 determines if the rule's directory matches the file's directory name (step 618). If the directory matches, the method 60 determines if the rule's size matches the file's size (step 619). If the size matches, the method 60 determines if the rule's date matches the file's date (step 620). If the date matches, the method 60 determines if the rule's time matches the file's time (step 621). If the time matches, the rule's ordinal number is returned and processing is exited for the current file (step 622). Per step 114 of FIG. 3B, the method 60 is then repeated for all remaining files.

Figure 6D:
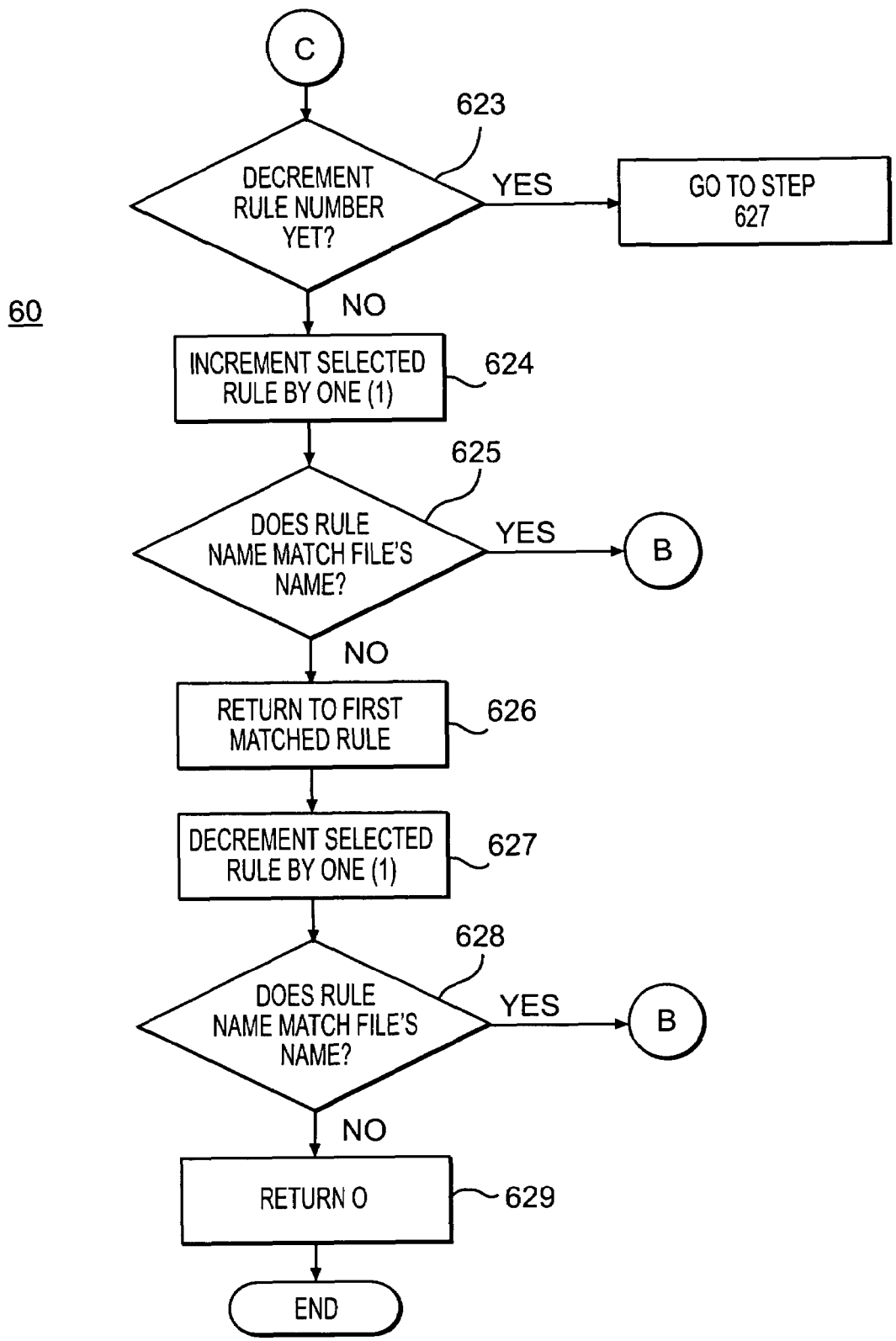

If, however, the steps 618-621 determine that the directory, size, date or time do not match, the method 60 checks the rules neighboring the rule that had the matching filename. The method 60 may check the rules with a higher number in the array Re first and then the rules with a lower number, or vice versa. As shown in FIG. 6D, if the rule number has already been decremented (step 623), the method 60 jumps to step 627. Otherwise, the method 60 moves up the explicit rule array Re one element from the array element having a matching file name (step 624). If the one-up rule's file name matches the file's name, return to step 618 (step 624). This is process is repeated until a one-up rule's file name does not match the file's name.

If the higher rules have been checked without a match, the method 60 returns to the first matched file name (step 626) and moves down the explicit rule array $R_e$ one element from the array element having a matching file name (step 627). If the one-down rule's file name matches the file's name, return to step 618 (step 628). This process is repeated until a one-down rule's file name does not match the file's name. If neither the first rule with a matching name found (in steps 610 or 614), nor its neighbors found in step 625 and 628, yield a match, then return 0 and exit processing (file does not match any rule) (step 629). Per step 114 of FIG. 3B, the method 60 is then repeated for all remaining files.

General Comparisons

String properties of files, such as file name and directory name, support wildcards, such as * and ?. In the Windows operating system, as well as in other naming conventions, the * wildcard represents zero or more characters, and the ? wildcard represents one and only one character. Therefore, "?pirian" matches "Spirian"

"Sp*" matches "Spirian"

"*" matches "Spirian

"???????" matches "Spirian

The rule-processing algorithm disclosed herein allows an implicit wildcard, as well as explicit wildcards, such as * or ?. Specifically, a null string in a rule field for file name or directory is equivalent to a * wildcard. Therefore, " " matches "Spirian", or any other string The implicit wildcard is particularly useful for writing rules that correspond to a file that could exist in any directory on a computer that is being migrated. In this case, the file name field is supplied, but the directory name field is left blank. As a result, any directory name is allowed for this rule.

Other file properties, such as size, date, and time, do not support wildcard characters.

Time Comparison

File time interpretation is subject to inconsistencies in the different version of Windows operating system, changes in time zones and Daylight Savings Time. All inconsistencies, though, result in a file time deviation of one hour, and no more. In other words, a file with a last modified time of 11:49 A.M., copied to another computer, may on inspection show a file time of 12:49 P.M. The rule-processing algorithm described above makes allowance for this inconsistency, allowing a tolerance of +/−60 minutes for file time comparisons. File time and rule time must be offset by exactly 60 minutes, though. In other words, for a match, the valid differences in file time are {−60, 0, +60} minutes.

Results

In practice, the optimized algorithm described herein above improves the speed of data rule-processing exponentially, as compared to a non-optimized one-to-one comparison of each file to each rule (F×R). In actual side-by-side testing, the optimized processing algorithm has yielded an over 100-fold reduction in the processing time required to migrate a computer OS, as shown in the table below:

| Workstation | File count | Time (non-optimized) | Time (optimized) | Improvement |
| --- | --- | --- | --- | --- |
| A | 140,000 | 9200 s | 90 s | 10,222% |

The limitations of the non-optimized approach to comparing files against rules becomes evident as the number of files or rules increases. Due to the sheer number of rules involved in many migrations, the processing of the rule set grows unwieldy, in some cases requiring many hours to complete the migration process for a single computer.

The optimized rule-processing algorithm disclosed herein significantly reduces the time required to compare all files to the rule set. Because of the efficiency of the binary search algorithm, the number of rules in a rule set can be squared before the time required to complete processing is doubled. This greatly improves the overall performance of the data preservation and migration processes.

Planning and Scheduling Module

Present commercially available application migration applications do not contain tools for planning OS migrations across enterprises and disparate compute environments. The planning and Scheduling Module ("PSM") is a collection of applications that automate the process of planning computer migrations.

Although not shown in FIG. 2, the PSM can be included in a suite of software tools existing on the Master Server 12, OSS 24 on any other server associated with the system.

Planning a migration involves taking into account resources and limitations/requirements (called "constraints" in the PSM system). Much of this information can be obtained via the network from the agents 32 as a result of their asset discovery operations performed at the individual computers 20, as discussed above. PSM produces an optimized schedule that maximizes resource utilization, meets most of the critical constraints, meets all the physical constraints, and does all this within the date bounds provided in the scenario. Performing this planning and scheduling task manually is difficult, if not impossible, due to the large number of variables involved as well as the massive amount of data. Even with most advanced workstations, this requires and sometimes exhausts all the available computing resources.

PSM allows an administrator to translate the priorities specified by the end user into an optimized migration schedule. To accomplish this, PSM automates the scheduling process and reduces the level of technical skill and knowledge required to generate an optimized migration plan.

The schedule generated by the PSM is presented to end user as a spreadsheet, such as an Excel spreadsheet. This spreadsheet contains details about each machine that is scheduled to migrate, including the migration date, hardware details, and details about the machine's primary user (such as e-mail address, phone number, etc.). An example of the schedule spreadsheet is shown in FIGS. 7A-D.

PSM employs three main technologies:

Rule-based processing—Rule-based processing enforces business logic and business rules.

Linear Programming (LP)—Linear Programming is a mathematical technique used in the field of optimization. PSM uses Linear Programming to generate "first guess" at a schedule by defining the upper and lower limits for the variables used to generate a schedule.

Constraint Programming (CP)—Constraint Programming refines the LP results and provides detailed results that become the migration plan.

PSM Schedule Generation

To generate a migration schedule, PSM takes into account both technical and business constraints to give each machine a migration date that is technically feasible and also meets business needs. The business constraints are supplied by the end user in the form of Rules. The technical constraints are built into the PSM system.

The following list shows examples of the kinds of constraints and rules that the PSM system uses to generate migration schedule. Restraints and rules different than those provided below may be used. End users may provide additional rules as needed.

Constraints

Migration Window Constraints

The migration window is from 7 PM to 2 AM local time. There is only one migration window per migration day.

The migration day boundary is 7 PM.

A migration window cannot cross a migration day boundary.

RSS Constraints

PSM assumes that the user data is flushed from the RSS 22 after five calendar days. For example, if a migration occurs on Friday, the user's stored data on the RSS will be flushed on Wednesday.

Note: In this example, the number of days that user data is retained can only be specified using calendar days. Business days and migrations days cannot be used.

Each RSS 22 has one ready date (i.e., the first date that the RSS 22 is available to support migrations) and one deadline (the date when the RSS is no longer available to support migrations).

Machine Constraints

The maximum data transfer rate per machine 20 is calculated based on the slowest subnet between the machine 20 and the RSS 22.

Every machine has access to only one RSS 22 which is assigned within ITRS by subnet.

If the assigned RSS 22 is unavailable, then that machine's migration will wait until that RSS is available.

Subnet Constraints

A subnet is independent from location.

A subnet has exactly one RSS 22 attached to it.

The maximum transfer rate per subnet is determined by constraints supplied by End User on a subnet by subnet basis.

Calculated Constraints

Transfer size of the migration—determined by current disk usage and application entitlements. This reflects the network traffic which will always exceed the storage size due to certain data traversing the network twice.

Storage size of the migration—determined by current disk usage.

Net transfer rate—determined by the minimum transfer rate of all subnets between a machine and its associated RSS.

Rules

Rules define the business requirements related to when a machine can be scheduled for migration. Rules are entered into PSM by an administrator based on data provided by End User.

PSM Migration Schedules>How PSM Generates a Schedule

Since there may br thousands of rules, they are not enumerated here. However, most rules fall into two categories—interval capacity constraints and coincidence constraints. Further, potential rules used to schedule migrations by End Users are described below.

Blackout Days

Blackout days define when migrations are not allowed to happen. Blackout days are determined by End User and can be expressed in a number of ways using days, dates, groups, and locations. The following types of blackout rules can be used:

Blackout a day of week. For example, do not migrate any machines on Saturdays, Sundays, and Wednesdays.

Blackout several dates for the specified groups at a location. For example, do not migrate any machines in a specified department in a particular city on certain dates.

Blackout all dates before a specified date before date for a location. For example, do not migrate any machines in a specific city before a date specific.

Blackout all days between two specified dates for a group at a location. For example, do not migrate any machines from a certain group in a specific geography on specific dates.

Interval Capacity Constraints

Interval capacity refers to setting maximum number of machines to migrate during a particular timeframe. For example, if you wanted to migrate a maximum of 30 machines on a given date, you would use an interval capacity constraint. The following types of interval capacity constraint rules are used:

Interval Capacity Constraint for a group at a location for a specific date. For example, migrate no more than a specified number of machines per day from a certain group in defined locations on a date specific.

Interval Capacity Constraint for a group at a location for a date range; could also be for group globally or all groups in site. For example, migrate 500 machines in specified time frame. Or, migrate 20 machines per day in specified time frame.

Coincidence Constraints

Coincidence constraints allows you to specify which machines should be migrated together. PSM attempts to migrate machines that are included in a coincidence constraint as closely together as possible. The following types of coincidence constraints are used:

Coincidence constraint for machines at a location. For example, migrate all machines in a defined city as closely together as possible.

Coincidence constraint for machines in a group. For example, migrate all machines in a defined group as closely together as possible.

Coincidence constraint for specified machine names. For example, machines WTKY0120333 and WTKY0007000 as closely together as possible.

Coincidence constraint for machines on a subnet. For example, migrate all machines on 150.215.016.000 at the same time.

Coincidence constraint for machines running a specified application. For example, migrate all machines with Microsoft Word as closely together as possible.

After the PSM generates a proposed schedule, there is some additional information that the end user can provide. The end user can also approve the schedule that PSM has produced. The procedure for doing this is as follows:

The administrator sends the proposed schedule in the form of an Excel spreadsheet to the end user.

The end user updates marked columns (indicated by a distinctive color) in the spreadsheet with the appropriate information.

The end user returns the spreadsheet to the administrator.

The administrator imports the spreadsheet into PSM.

The administrator exports the final schedule from PSM to a spreadsheet, then sends it to the end user for confirmation.

The confirmed schedule spreadsheet can then be input into the system 10 through the master server 12 or OSS 24 to schedule the migration or deployment.

The foregoing description provides illustration and description, but is not intended to be exhaustive or to limit the invention to the embodiments disclosed. Modifications and variations are possible consistent with the above teachings or may be acquired from practice of the embodiments disclosed. Therefore, it is noted that the scope is defined by the claims and their equivalents.

The invention claimed is:

1. A method comprising:
   generating a rule set, each rule from the rule set having a filename,
   the generating including:
      determining whether a filename of a rule from the rule set includes a wildcard;
      adding the rule to a wildcard array of rules when the filename of the rule includes the wildcard; and
      adding the rule to an explicit array of rules when the filename of the rule does not include the wildcard;
   determining that a first set of files from a plurality of files on a computer should not be preserved based on the rule set;
   preserving a second set of files from the plurality of files based on the determining associated with the first set of files, the second set of files being different than the first set of files;
   performing a system migration associated with the computer; and
   downloading the preserved files associated with the computer.

2. The method of claim 1, wherein the generating includes retrieving a file that includes the rule set.

3. The method of claim 1, wherein the generating includes parsing at least one rule from the rule set into its component fields.

4. The method of claim 1, wherein the generating includes:
   repeating the determining associated with the filename, the adding associated with the wildcard array or rules, and the adding associated with the explicit array of rules for each rule from the rule set; and
   sorting the explicit array of rules.

5. A method, comprising:
   determining that a first set of files from a plurality of files on a computer should not be preserved based on rules that specify which files should not be preserved, the rules including a set of wildcard rules,
   the determining including:
      comparing a file from the plurality of files to the set of wildcard rules, one wildcard rule at a time, until a match is found or until the file is compared to the entire set of wildcard rules;
      indicating that the file is not to be preserved if a match is found; and
      repeating the comparing and the indicating for each file from the plurality of files;
   preserving a second set of files from the plurality of files based on the determining, the first set of files being different than the second set of files;
   performing a system migration associated with the computer; and
   downloading the preserved files associated with the computer.

6. The method of claim 5, further comprising:
   applying a set of explicit rules to each file from the plurality of files on the computer.

7. The method of claim 6, further comprising:
   recursively searching the set of explicit rules based on each file from the plurality of files to determine whether at least one file from the plurality of files matches at least one explicit rules from the set of explicit rules.

8. A method, comprising:
   determining that a first set of files from a plurality of files on a computer should not be preserved based on rules that specify which files should not be preserved, the rules including a set of explicit rules, each rule from the set of explicit rules having a filename,
   the determining including:
      conducting a binary search of the set of explicit rules based on a file from the plurality of files,
      the conducting including:
         selecting a rule at a midpoint of the set of explicit rules; and
         determining whether a name of the file occurs before or after a filename associated with the rule when the name of the file does not match the filename of the rule at the midpoint of the set of explicit rules;
      indicating that the file is not to be preserved when the file is matched to an explicit rule based on the conducting; and
      repeating the conducting and the indicating for each file from the plurality of files,
   preserving a second set of files from the plurality of files based on the determining associated with the first set of files, the first set of files being different than the second set of files;
   performing a system migration on the computer; and
   downloading the preserved files to the computer.

9. The method of claim 8, wherein the explicit rules have a first portion and a second portion,
   the conducting includes:
      selecting a rule from a first portion of the set of explicit rules when the name of the file occurs before the filename of the rule at the midpoint of the set of explicit rules;
      if the name of the file does not match the filename of the rule at the midpoint of the first portion of the set of explicit rules, determining whether the name of the file occurs before or after the filename of the rule at the midpoint of the first portion of the set of explicit rules;
      if the name of the file occurs before the filename of the rule at the midpoint of the first portion of the set of explicit rules, selecting a rule at the midpoint between the beginning of the set of explicit rules and the midpoint of the first portion of the set of explicit rules; and
      if the name of the file occurs after the filename of the rule at the midpoint of the first portion of the set of explicit rules, selecting a rule at the midpoint between the midpoint of the first portion of the set of explicit rules and the midpoint of the set of explicit rules.

10. The method of claim 8, wherein the conducting includes repeatedly selecting rules at midpoints of increasingly smaller subsets of the set of explicit rules until the file matches an explicit rule from the set of explicit rules or until the binary search exhausts a plurality of index values.

11. A computer-readable medium comprising code representing instructions to cause a processor to:
   generate a rule set, each rule from the rule set having a filename, the code to generate including instructions to cause the processor to:
      determine whether a filename associated with a rule from the rule set includes a wildcard;
      add the rule to a wildcard array of rules when the filename of the rule includes the wildcard; and
      add the rule to an explicit array of rules when the filename of the rule does not include the wildcard;
   determine that a first set of files on a computer should not be preserved based on the rule set;
   preserve a second set of files on the computer different than the first set of files based on the code to determine associated with the first set of files;
   perform a system migration associated with the computer; and
   download the preserved files associated with the computer.

12. The computer-readable medium of claim 11, the code further comprising code to:
   retrieve a file that includes the rule set.

13. The computer-readable medium of claim 11, the code further comprising code to: parse at least one rule from the rule set into its component fields.

14. The computer-readable medium of claim 11, the code further comprises code to:
   repeat the code to determine associated with the filename, the code to add associated with the wildcard array of rules, and the code to add associated with the explicit array of rules for each rule from the rule set; and
   sort the explicit array of rules.

15. The computer-readable medium of claim 11, wherein the rule set specifies which files should not be preserved.

16. The computer-readable medium of claim 11, the code further comprises code to: apply a set of explicit rules from the explicit array of rules to each file from the plurality of files on the computer.

17. The computer-readable medium of claim 16, the code further comprising code to: recursively search the set of explicit rules to determine whether at least one file from the plurality of files matches at least one explicit rules from the set of explicit rules.

18. A computer-readable medium comprising code representing instructions to cause a processor to:

determine that a first set of files from a plurality of files on a computer should not be preserved based on rules that specify which files should not be preserved, the rules including a set of wildcard rules, the code to determine including instructions to cause the processor to:

compare a file from the plurality of files to the set of wildcard rules, one wildcard rule at a time, until a match is found or the file is compared to the entire set of wildcard rules;

indicate that the file is not to be preserved when a match is found; and repeat the code to compare and the code to indicate for each file from the plurality of files;

preserve a second set of files from the plurality of files based on the code to determine, the second set of files being different than the first set of files;

perform a system migration associated with the computer; and download the preserved files associated with the computer.

19. A computer-readable medium comprising code representing instructions to cause a processor to:

determine which files from a plurality of files on a computer should not be preserved based on rules that specify which files should not be preserved, the rules including a set of explicit rules, each rule from the set of explicit rules being associated with a filename, the code to determine including instruction to cause the processor to:

conduct a binary search of the explicit rules based on a file from the plurality of files, the code to conduct including instructions to cause the processor to:

select a rule at the midpoint of the set of explicit rules; and if a name of the file does not match a filename of the rule at the midpoint of the set of explicit rules, determine whether the name of the file occurs before or after the filename of the rule at the midpoint of the set of explicit rules;

indicate that the file is not to be preserved when the file is matched to an explicit rule from the set of explicit rules; and repeat the code to conduct and the code to indicate for each file from the plurality of files.

20. The computer-readable medium of claim 19, wherein the set of explicit rules has a first portion and a second portion, the code to conduct includes instructions to cause the computer to:

select a rule at the midpoint of the first portion of the set of explicit rules, when the name of the file occurs before the filename of the rule at the midpoint of the set of explicit rules;

if the name of the file does not match the filename of the rule at the midpoint of the first portion of the set of explicit rules, determine if the name of the file occurs before or after the filename of the rule at the midpoint of the first portion of the set of explicit rules;

if the name of the file occurs before the filename of the rule at the midpoint of the first portion of the set of explicit rules, select a rule at the midpoint between the beginning of the set of explicit rules and the midpoint of the first portion of the set of explicit rules; and if the name of the file occurs after the filename of the rule at the midpoint of the first portion of the set of explicit rules, select a rule at the midpoint between the midpoint of the first portion of the set of explicit rules and the midpoint of the set of explicit rules.

21. The computer readable medium of claim 19, wherein the code to conduct includes instructions to cause the computer to: repeatedly select rules at midpoints of increasingly smaller subsets of the set of explicit rules until the file matches at least one explicit rule from the set of explicit rules or until the binary search exhausts a plurality of index values.

* * * * *